Figure 1:
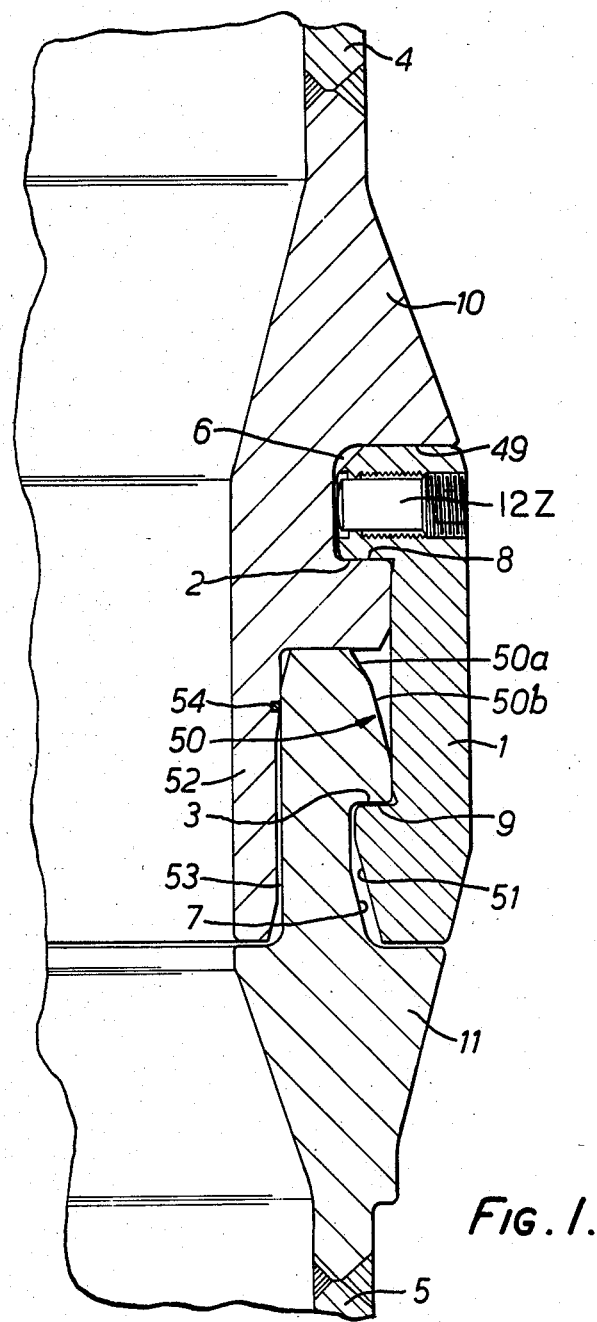

United States Patent [19]

McGugan

[11] Patent Number: 4,547,003
[45] Date of Patent: * Oct. 15, 1985

[54] PIPE CONNECTORS

[75] Inventor: John D. McGugan, Aberdeen, Scotland

[73] Assignee: Hunting Oilfield Services (U.K.) Limited, Aberdeen, Scotland

[*] Notice: The portion of the term of this patent subsequent to Jul. 17, 2001 has been disclaimed.

[21] Appl. No.: 459,119

[22] Filed: Jan. 19, 1983

Related U.S. Application Data

[63] Continuation-in-part of Ser. No. 560,278, Dec. 13, 1983, Pat. No. 4,460,201, which is a continuation of Ser. No. 233,575, Feb. 11, 1981, abandoned.

[30] Foreign Application Priority Data

Jan. 27, 1982 [GB] United Kingdom ............... 8202273

[51] Int. Cl.⁴ ............................................. F16L 21/06
[52] U.S. Cl. ..................... 285/27; 285/407; 285/419; 285/DIG. 22
[58] Field of Search ............... 285/419, DIG. 22, 407, 285/27, 319, 322

[56] References Cited

U.S. PATENT DOCUMENTS

| | | | |
|---|---|---|---|
| 991,374 | 5/1911 | Rolle | 285/319 |
| 1,043,806 | 11/1912 | Dahl | 285/373 X |
| 2,452,219 | 10/1948 | Bergvall et al. | 285/DIG. 22 X |
| 2,550,591 | 4/1951 | Parsons | 285/319 |
| 2,690,939 | 10/1954 | Whaley | 285/365 X |
| 2,777,714 | 1/1957 | Lamphere | 285/410 X |
| 3,133,777 | 5/1964 | Anhalt | 285/DIG. 22 X |
| 3,603,621 | 9/1971 | Parsons | 285/319 |
| 3,625,549 | 12/1971 | De Vries | 285/373 X |
| 3,984,133 | 10/1976 | Bird | 285/DIG. 22 X |
| 4,030,850 | 6/1977 | Hyde | 285/DIG. 22 X |
| 4,106,799 | 8/1978 | Oefiker | 285/365 |
| 4,460,201 | 7/1984 | McGugan | 285/18 |

Primary Examiner—Thomas F. Callaghan
Attorney, Agent, or Firm—Watson, Cole, Grindle & Watson

[57] ABSTRACT

A pipe connector comprises a split annular ring for surrounding and engaging the end portions of two pipes. The ring has a generally U-shaped radial section providing arms having inwardly extending transverse surfaces directed towards each other and which, when the ring is engaged on the pipe ends, engage outwardly extending transverse surfaces on the pipe ends. The ring is permanently engaged with one pipe and is resiliently expandable to permit engagement of the other pipe therewith, corresponding surface portions of the pipe end portion and ring being shaped so that the ring is automatically expanded as the other pipe end portion is engaged therewith. Centering and guiding means comprising a cylindrical extension on the one pipe which is received within the other pipe are provided for maintaining coaxiality between the pipes as they are brought together and the other pipe is engaged with the ring.

15 Claims, 2 Drawing Figures

PIPE CONNECTORS

RELATED APPLICATION

This application is a continuation-in-part of application Ser. No. 560,278, filed Dec. 13, 1983 now U.S. Pat. No. 4,460,201 which is a continuation of Ser. No. 233,575, filed Feb. 11, 1981 and now abandoned.

The present invention relates to a pipe connector of the type described in U.S. Pat. No. 4,460,201 particularly but not exclusively for inter-connecting pipe sections to form a pipe string for use in drilling and/or completion of off shore oil or gas wells, and particularly to a connector which may provide a connection capable of withstanding high axial loads, for example in pile driving.

The connectors described in the aforementioned U.S. patent comprise a split annular ring for surrounding and engaging the end portions of two abutted pipes. The split ring is in use permanently connected with one pipe end portion and is resiliently expandable by operating means to enable connection and disconnection.

According to the present invention there is provided a pipe connector for connecting the abutted end portions of two pipes each of which is provided with an outwardly extending surface transverse to the axis of the respective pipe and directed away from the respective pipe end, comprising a split annular ring for surrounding the abutted pipe end portions substantially completely and having a pair of inwardly extending surfaces transverse to the axis thereof and directed towards each other and for engagement with a respective one of the surfaces on the pipe end portions, means for retaining the ring relative to one pipe end portion such that, in use, the ring is permanently engaged with the said one pipe end portion, wherein the ring is resiliently expandable to permit engagement of the other pipe end portion therewith, corresponding surface portions of the ring and the other pipe end portion being so shaped that the ring is automatically expanded as the other pipe end portion is progressively engaged therewith, guide means being provided for maintaining alignment of the pipe end portions during engagement of the other pipe end portion with the ring.

If it is required that the other pipe end portion be disengageable from the ring, operating means are provided for expanding the ring relative to the one pipe end portion so as to disengage it from the other pipe end portion.

Figure 2:
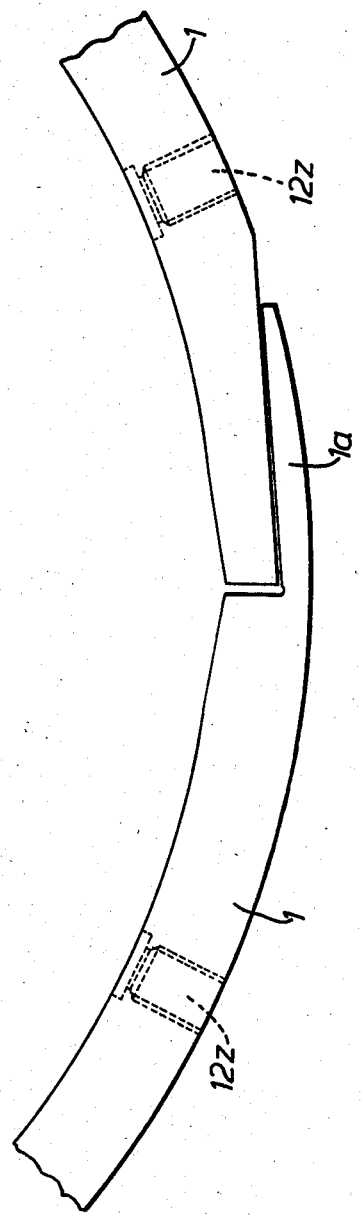

An embodiment of the invention will now be described with reference to the accompanying drawings, in which:

FIG. 1 is a part axial section showing two pipe end portions connected according to the present invention; and FIG. 2 is a plan view of part of the connector of FIG. 1.

The drawings show a pipe connector for connecting the ends of two pipes or pipe sections of a pipe string for use in the drilling and/or completion of an offshore oil or gas well and which is capable of withstanding pile driving forces.

The pipe connector comprises a split annular member or ring 1 which has a generally U-shaped radial section, the arms of the U of which provide inwardly extending transverse surfaces 2, 3 which are directed towards each other. The two pipes 4, 5 to be connected together are provided, adjacent the ends to be abutted, with annular grooves 6, 7 providing oppositely directed outwardly extending transverse surfaces 8, 9. In a modification the surfaces 8, 9 may be provided by flanges on the ends of the pipes 4, 5. As shown, surfaces 8, 9 are provided on pipe end members 10, 11 which are fixed, e.g. by welding, to the ends of the pipes 4, 5 to be connected together. The surfaces 8, 9 may alternatively be provided on integral end portions of the pipes.

In use, as shown in FIG. 1, the ring 1 surrounds the abutted pipe end portions with the surfaces 2, 3 of the ring cooperating with respective surfaces 8, 9 of the pipe end portions to hold the ends of the pipe together.

The surfaces 2, 3 and 8, 9 may extend in radial planes or be inclined inwardly or outwardly as described in the above referred to U.S. patent. As shown these surfaces are slightly inclined, for example by about 1°, to the radial plane and in a direction to converge inwardly of the pipes.

The ring 1 is, in its relaxed condition, dimensioned so as to engage the pipe end portions as shown in FIG. 1 and is resiliently expandable radially. In this embodiment surface 2 of the ring 1 has a greater radial inward extent than surface 3 so that surfaces 2, 8 have a greater radial overlap than surfaces 3, 9. Thus when the ring 1 is radially expanded surface 3 will disengage from surface 9 before surface 2 disengages from surface 8. As described in the above referred to U.S. patent, the connector is arranged so that the ring 1 is in use permanently mounted on pipe end portion or member 10. Other means for permanently retaining the ring 1 on pipe end portion or member 10 may alternatively be provided.

The connector shown in FIG. 1 is designed to enable engagement of pipe end portion or member 11 with the ring 1 automatically, engagement of the member 11 with the ring causing the ring to expand radially sufficient to permit engagement. This means that the action of positively expanding the ring 1 employed in the connectors described in the above referred to U.S. patent is avoided. To this end the outer surface portion 50 at the free end of member 11 is cut away to provide it with a generally frusto-conical shape as is the inner surface portion 51 at the corresponding end of the ring. Surface 50 has two parts 50a, 50b, lead in part 50a having a larger cone angle than part 50b which has substantially the same cone angle as surface 51. Thus when member 11 is telescoped into ring 1, telescoping initially occurs freely until surfaces 50b and 51 come into contact. Thereafter these two surfaces slide one on the other with expansion of ring 1 until the pipe end members 11, 10 are in abutment and the ring 1 snaps into engagement with member 11.

During this telescoping movement, as ring 1 is expanded, the ring is not positively centred on pipe end member 10 so that if there are no restraints on the system, if either of the two members 10, 11 were inadvertently moved laterally, this could cause disengagement of the ring 1 from the member 10. To prevent this occurring, guiding and centring means are provided for ensuring that the pipe end portions or members remain in alignment during the telescoping movement of member 11 into ring 1. As shown, pipe end member or portion 10 is provided with a cylindrical extension 52 which is received in a recess 53 in member 11. There is a small clearance provided between extension 52 and recess 53 over the major part of their extent to permit slight misalignment but this clearance is reduced for the terminal stages of engagement. Conveniently a seal 54 is provided in the region of reduced clearance to seal the junction between the two pipes.

It will be appreciated that other centring means may be provided, for example by a cylindrical extension from member 11 which is received by member 10 or by a separate cylindrical member which is received by both members 10 and 11.

It will be appreciated from the foregoing, that a certain force is required to telescope member 11 into the ring 1. The connector is designed so that this force can be provided by the weight of one of the two pipes which is being connected to the other, with the two pipes being arranged with a vertical orientation. Preferably pipe 4 together with member 10 is lowered on to pipe 5 and the weight of pipe 4 is used to push the ring over member 11 of pipe 5, axial forces on the ring being resisted by abutment between the ring and surface 49 of the groove 6.

For uncoupling the pipes, operating means are provided for positively expanding ring 1 sufficiently to disengage the ring from member 11. These operating means may be as described in any of the embodiments of the above referred to U.S. patent but are preferably as shown in FIG. 11 of such patent and comprise a plurality of threaded members 12Z which extend through the arm of the U of the ring 1 associated with pipe end portion or member 10 and bear on the base of the groove 6. In this embodiment seven such operating members are provided, two being spaced angularly about 25° from the split in the ring, a further two being spaced angularly by about 75° from the first two and the remaining three being spaced angularly by about 40° over the remainder of the circumference of the ring between the second two members.

The ring, as is described in the above referred to U.S. patent, may have means associated with the split ends of the ring to hold the end portions of the ring together when it is engaged on two pipe end portions to ensure that the ring is not inadvertently expanded. Alternatively, as shown in FIG. 2, one end of the ring may include a circumferentially extending portion 1a which overlaps the other end of the ring, for example to prevent an operators' finger being trapped in the split during assembly.

When used for connecting the ends of metal pipe sections of pipe strings, the ring may for example be made of high tensile steel.

What is claimed is:

1. A pipe connector for connecting the abutted end portions of two pipes each of which is provided with an outwardly extending surface transverse of the axis of the respective pipe and directed away from the respective pipe end, comprising a split annular ring for surrounding the abutted pipe end portions substantially completely and having a pair of inwardly extending surfaces transverse to the axis thereof and directed towards each other and for engagement with a respective one of the surfaces on the pipe end portions, means for retaining said ring relative to one of said pipe end portions such that, in use, said ring is permanently engaged with said one pipe end portion, wherein said ring is resiliently expandable to permit engagement of the other pipe end portion therewith, corresponding surface portions of said ring and said other pipe end portion being so shaped that said ring is automatically expanded as said other pipe end portion is progressively engaged therewith, and guide means are provided for maintaining alignment of said pipe end portions during engagement of said other pipe end portion with said ring.

2. A pipe connector as claimed in claim 1, comprising operating means for causing expansion of said ring relative to the one pipe end portion so as to permit disengagement of said other pipe end portion from said ring.

3. A pipe connector as claimed in claim 2, wherein said operating means comprise a plurality of angularly spaced radial members threaded into radial openings in said ring and in operation bearing on said one pipe end portion.

4. A pipe connector according to claim 1, wherein said guide means comprise a cylindrical element coaxial with said one pipe end portion and which is received within said other pipe end portion.

5. A pipe connector as claimed in claim 4, wherein said cylindrical element is integral with said one pipe end portion.

6. A pipe connector according to claim 1, wherein the portion of the outer surface of said other pipe end portion adjacent the free end which initially contacts the ring during engagement of the other pipe end portion therewith has a generally frusto-conical shape and the portion of the surface of said ring which is initially contacted by said other pipe end portion is also generally frusto-conical.

7. A pipe connector according to claim 6, wherein portions of said surface portions of said other pipe end portion and said ring have substantially identical angles of conicity, the pipe end portion surface including a lead in portion which has a larger angle of conicity.

8. A pipe connector as claimed in claim 1, wherein said inwardly extending surface of said ring which engages said one pipe end portion is radially longer than said inwardly extending surface of said ring which engages said other pipe end portion, such that expansion of said ring to permit engagement and disengagement of said other pipe end portion therefrom is insufficient to cause disengagement of said ring from said one pipe end portion.

9. A pipe connector as claimed in claim 1, wherein said ring is generally U-shaped in radial section with one arm of the U providing the surface engaging said one pipe end portion being longer than the other arm of the U.

10. A pipe connector as claimed in claim 1, wherein said outwardly extending surface on said one pipe end portion is provided by a surface of an annular groove in which said ring is received, the opposed outwardly extending surface of said groove resisting axial forces on said ring arising during engagement of said other pipe end portion with said ring.

11. A pipe connector as claimed in claim 1, wherein said transverse surfaces on said pipe end portions and ring lie in radial planes.

12. A pipe connector as claimed in claim 1, wherein said transverse surfaces on said pipe end portions and ring are correspondingly mutually inclined in a direction to converge outwardly of said pipe end portions.

13. A pipe connector as claimed in claim 1, wherein said transverse surfaces on said pipe end portions and said ring are correspondingly mutually inclined in a direction to converge inwardly of said pipe end portions.

14. A pipe connector as claimed in claim 12, wherein said transverse surface on said one pipe end portion and said corresponding surface on said ring lie in radial planes.

15. A pipe connector as claimed in claim 13, wherein said transverse surface on said one pipe end portion and said corresponding surface on said ring lie in radial planes.

* * * * *